July 16, 1946.     E. G. DANILLA     2,404,166
DEVICE FOR USE IN ROASTING POULTRY AND THE LIKE
Filed Oct. 2, 1943
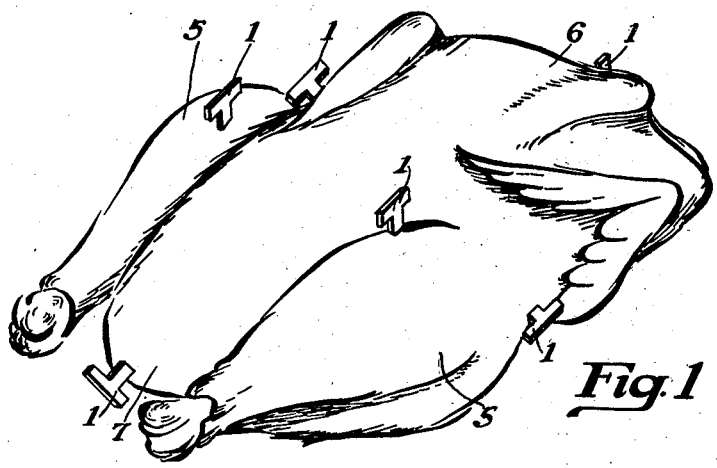
Fig. 1
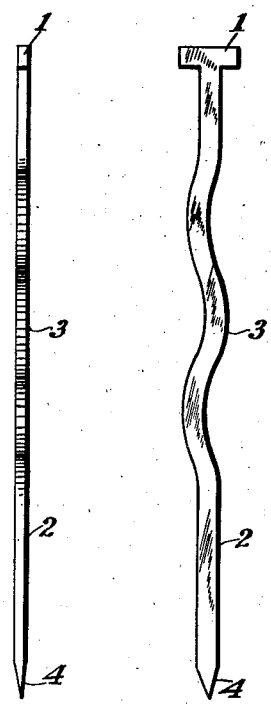
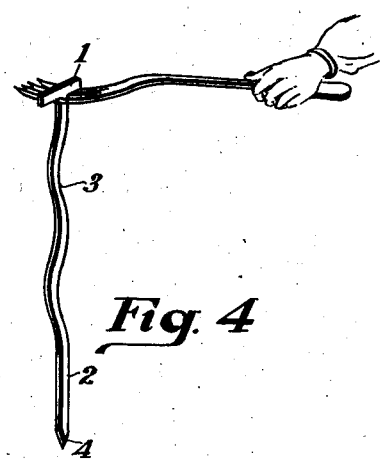
Fig. 4
Fig. 3    Fig. 2
INVENTOR.
EMMA G. DANILLA.

Patented July 16, 1946

2,404,166

UNITED STATES PATENT OFFICE 2,404,166

DEVICE FOR USE IN ROASTING POULTRY AND THE LIKE

Emma G. Danilla, Berlin Heights, Ohio

Application October 2, 1943, Serial No. 504,783

1 Claim. (Cl. 99—419)

This invention relates, as indicated, to a method of roasting poultry and to a device used in connection therewith.

It has heretofore been proposed to roast beef and the like articles of food by mounting them on skewers of various shapes and forms, the primary function of the skewers being to hold the beef or other article of food in a predetermined position during the roasting process, the skewers in some instances serving only incidentally to transmit heat to the interior of the roast.

The present invention has, as its primary object the provision of devices which have no holding function akin to the skewers to which reference has been made, but which have as their primary and sole function the transmission or conduction of heat to portions of the poultry or other article of food to which the heat of the roasting operation is usually inaccessible or accessible only after long periods of roasting. These portions in the case of poultry, are usually the interior of the thighs, the interior of the breast, and the interior of the posterior portion.

Another object of the invention is the provision of a device of the character described which can be easily and quickly stamped from sheet metal and which is so designed as to be highly effective in the transmission of heat to portions of the poultry to which reference has been made.

A further object of the invention is the provision of a device of the character described which can be quickly and easily inserted into the poultry, but which is readily removable therefrom after the roasting operation.

A still further object of the invention is the provision of a novel method of accelerating the roasting of poultry and the like.

Other objects and advantages of the invention will be apparent during the course of the following description.

In the accompanying drawing, forming a part of this specification, and in which like numerals are employed to designate like parts throughout the same.

Fig. 1 is a perspective view of poultry ready for roasting and having embedded in various critical portions thereof the novel heat transmitting devices of the present invention;

Fig. 2 is a front elevation of a heat-conducting device made in accordance with the invention;

Fig. 3 is a side elevation of the device shown in Fig. 2, and

Fig. 4 is a view showing the manner in which the device is removed from the poultry after it has served its purpose.

Referring more particularly to the drawing, it will be seen that the novel heat transmitting device of the invention comprises a one-piece metallic element, preferably stamped from sheet steel, sheet aluminum or the like, and consisting of a transverse head 1 and a shank 2 having an intermediate portion 3 of sinusoidal form and a pointed end 4.

In the preparation of poultry of ordinary size, approximately six of such devices, about five inches in length, will be employed, the devices being inserted into or embedded in the poultry in the manner shown in Fig. 1. Referring to this figure, it will be seen that two of the devices have been inserted into the thighs 5 of the poultry, one of the devices has been inserted longitudinally into the breast 6 of the poultry, two of the devices have been inserted laterally into the breast, and one of the devices has been inserted longitudinally into the posterior 7 of the poultry.

The poultry, as thus prepared, is now ready for roasting, and it has been determined that, due to the heat transmitting characteristics of the devices which have been described, that the period of roasting can be reduced by one-fourth to one-third of the time usually required for roasting, thereby effecting considerable economy in fuel consumption. Moreover, portions of the interior of the poultry which are extremely difficult to roast, or can be roasted only at the expense of over-cooking or burning of the exterior portions of the poultry, can be thoroughly roasted.

The sinusoidal portions 3 of the devices are effective not only to maintain the devices against displacement from the poultry during the handling of the poultry and during the roasting operation, but, due to their extended surface, provide additional heat radiating surface which aids in the roasting operation. On the other hand the portions 3 are so formed as not to offer any appreciable resistance to the removal of the heat transmitting devices from the poultry after the roasting operation, the devices being readily removable by inserting the prongs of a fork under the heads and lifting them out of the poultry by means of a fork, as illustrated in Fig. 4 of the drawing.

It is thus seen that I have provided an inexpensive device which is well adapted to fulfill the objects of the invention.

Although the invention has been described particularly with reference to the roasting of poultry, it is to be understood that the device may be effectively used in the roasting of meat and other articles of food, as well as in culinary processes other than roasting.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A device for use in roasting poultry and the like, said device comprising a one-piece thin flat metallic element consisting of a long shank having an intermediate portion of sinusoidal form and a pointed end, and a head at the other head of said shank extending transversely of said shank to form a T with said shank, said head disposed in the same plane as the shank, said shank adapted for insertion into the poultry prior to the roasting thereof, whereby said sinusoidal intermediate portion thereof provides an extended surface for conducting heat to the tissues of said poultry and thereby accelerating and increasing the efficiency of the roasting process, said head being relatively small, so that when said shank has been substantially fully inserted into the poultry, the head will not extend sufficiently outwardly from the poultry to interfere with the handling and placement of the poultry before, during, and after the roasting operation, and yet will extend sufficiently to permit removal of the device from the poultry by means of a fork having the tines thereof placed under said head.

EMMA G. DANILLA.